United States Patent [19]
Fuesser et al.

[11] Patent Number: 5,722,358
[45] Date of Patent: Mar. 3, 1998

[54] TUBE WITH VARIABLE INSIDE DIAMETER

[75] Inventors: Rolf Fuesser, Ingersheim; Georg Knoch, Ludwigsburg; Heinz Mueller, Remseck; Helmut Spannbauer, Ludwigsburg; Martin Weindorf, Kornwestheim, all of Germany

[73] Assignee: Filterwerk Mann & Hummel GmbH, Ludwigsburg, Germany

[21] Appl. No.: 591,009

[22] Filed: Jan. 24, 1996

[30] Foreign Application Priority Data

Jan. 24, 1995 [DE] Germany .................. 195 01 981.4
May 11, 1995 [DE] Germany .................. 195 17 382.1

[51] Int. Cl.⁶ .................................................. F02M 35/10
[52] U.S. Cl. .................................................. 123/184.56
[58] Field of Search .................. 123/184.51, 184.52, 123/184.56

[56] References Cited

U.S. PATENT DOCUMENTS

| | | | |
|---|---|---|---|
| 3,875,918 | 4/1975 | Loynd | 123/184.56 |
| 4,928,638 | 5/1990 | Overbeck | 123/184.56 |
| 5,216,985 | 6/1993 | Brümmer et al. | 123/184.56 |
| 5,311,848 | 5/1994 | Isaka et al. | 123/184.56 |

FOREIGN PATENT DOCUMENTS

| | | | |
|---|---|---|---|
| 2137646 | 6/1995 | Canada. | |
| 2545577 | 11/1984 | France. | |
| 2614674 | 11/1988 | France. | |
| 1924047 | 11/1970 | Germany. | |
| 2952600 | 7/1981 | Germany. | |
| 3300499 | 7/1984 | Germany. | |
| 4441217 | 6/1995 | Germany. | |
| 62-13768 | 1/1987 | Japan | 123/184.56 |
| 63-18134 | 1/1988 | Japan | 123/184.56 |
| 1166843 | 4/1967 | United Kingdom. | |
| 1305827 | 2/1973 | United Kingdom. | |
| 2243187 | 10/1991 | United Kingdom. | |

*Primary Examiner*—Erick R. Solis
*Attorney, Agent, or Firm*—Evenson, McKeown, Edwards & Lenahan P.L.L.C.

[57] ABSTRACT

A tube, particularly suitable for use as a part of the intake manifold of an internal-combustion engine, having an inside diameter which can be changed as a function of the operating condition of the internal-combustion engine.

12 Claims, 5 Drawing Sheets

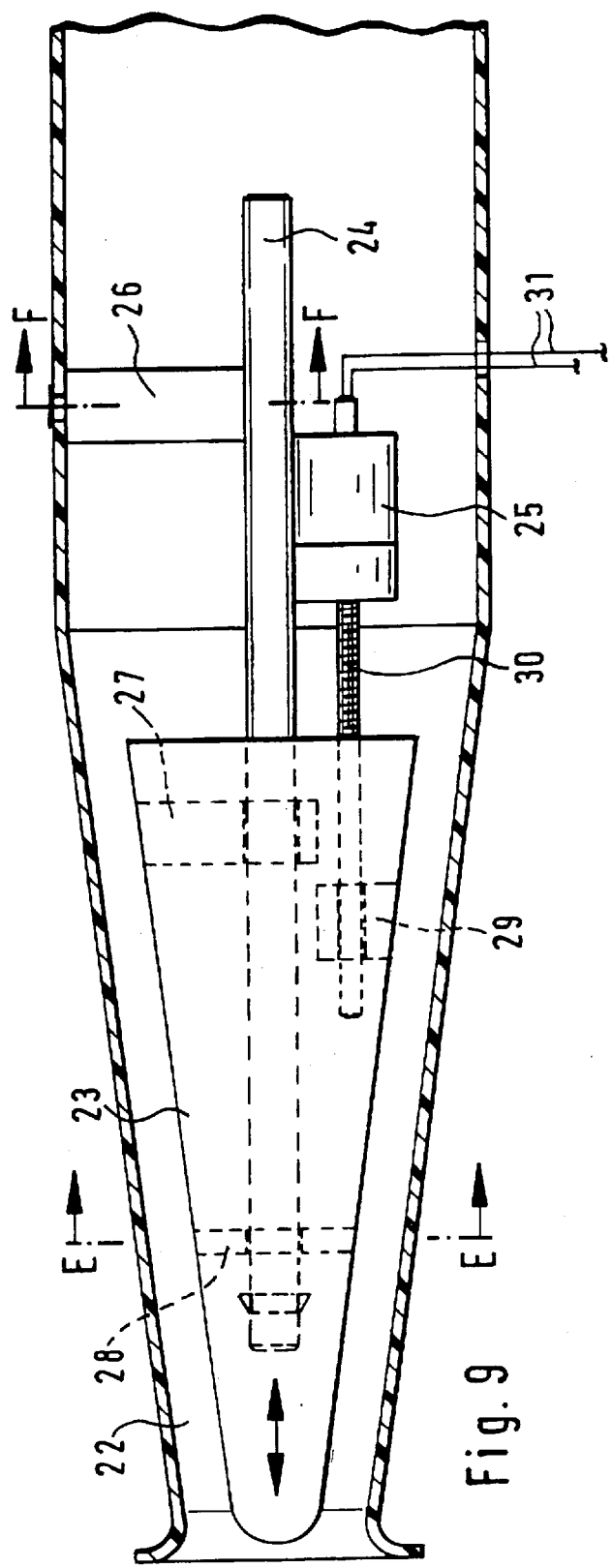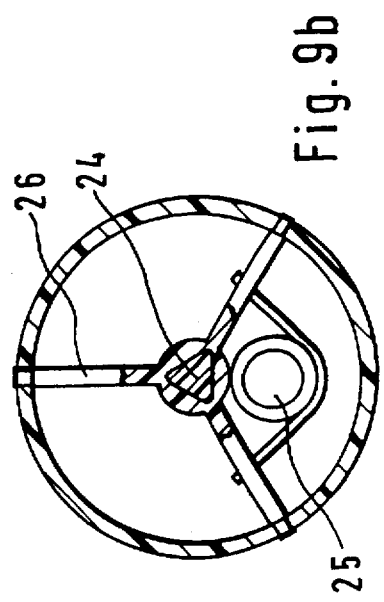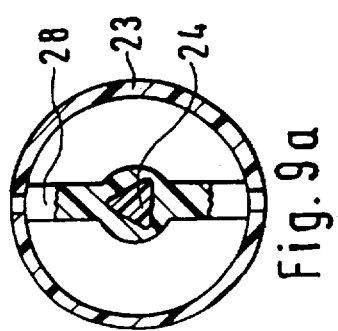

TUBE WITH VARIABLE INSIDE DIAMETER

BACKGROUND OF THE INVENTION

This invention relates to a tube, particularly suitable for use as part of the intake manifold of an internal-combustion engine.

Tubes of this type are known, for example as intake manifold tubes having a constant inside diameter in internal-combustion engines. If such intake tubes are to be used, for example, in passenger cars in which the requirements to minimize the generation of noise are particularly high, it is disadvantageous that in certain rotational speed ranges the sound pressure level of low sounds becomes excessive.

This high sound pressure level could be alleviated by increasing the length of the intake tube as a whole or by reducing the diameter of the intake tube, but such measures would result in excessive flow resistance at higher rotational speeds. This is usually not possible for technical reasons.

Another possible solution is to attach Helmholtz resonators. However, this involves high costs, and the available space for such resonators in the engine compartment is frequently very limited.

SUMMARY OF THE INVENTION

It is an object of the invention to provide a tube suitable for use as part of the intake manifold of an internal combustion engine, which tube has an internal diameter that can be changed easily, simply and reliably.

This and other objects are achieved in accordance with the present invention by providing a tube suitable for use as a part of the intake manifold of an internal-combustion engine, said tube having an inner surface provided with at least one adjusting element for controllably changing the inside diameter of the tube.

In accordance with the invention a tube is constructed having an inside surface provided with at least one element which can change the inside diameter of the tube. At low engine rotational speeds, a clearly smaller tube cross-section will be adequate to carry the fluid flow than would normally be designed to accommodate the fluid flow under maximal engine load.

This smaller tube diameter, which is caused by the element narrowing the cross-section, provides a significantly lower noise emission in the intake area. The possibility of changing the cross-section permits a respective optimal relationship of the intake noise to the performance and fuel consumption. At low rotational speeds with a narrow cross-section, the intake noise is damped. In the higher rotational speed range with the large cross-section, the flow resistance is kept low.

An advantageous further embodiment envisions that the element which changes the inside diameter of the tube is constructed as an expansion body. This expansion body slides inside the tube in such a manner that possible cross-sectional changes occur continuously and concentrically. The volume change is effected by means of an auxiliary medium. By supplying or withdrawing the auxiliary medium, the elastic shell of the expansion body changes configuration, and the volume of the expansion body also changes accordingly.

Alternatively, it may advantageously be provided that the elements changing the inside diameter of the tube comprise, for example, at least two shell segments which define the inside diameter of the tube by means of relative movements similar to the movements of an iris diaphragm.

Another advantageous embodiment of the invention envisions that the expansion body, which can change its volume, is provided with supporting inserts, in particular with supporting inserts which comprise polyurethane resin (PUR) foam.

The advantage of PUR supporting bodies in particular, which preferably have a segmented construction, is that they exert a dual function. On the one hand, they serve as supports, and on the other hand, their own volume may change when the cross-sectional diameter is appropriately enlarged.

Another advantageous further embodiment provides that the expansion body, which can change its volume, communicates with the intake system and/or the electric control system of the internal-combustion engine. In this manner, a controlled cross-sectional change of the tube can be realized.

Another advantageous embodiment of the invention envisions that the expansion body, which can change its volume, has a vacuum connection. By applying a vacuum through this vacuum connection to the expansion body, particularly via the intake manifold, it is possible to change the inside diameter of the intake tube in accordance with the rotational speed of the engine. If desired, this rotational speed dependent change of the tube inside diameter may be supported, for example, by at least one electrically and/or pneumatically operating valve. The control is achieved essentially as a function of the pressure drop across the engine air filter.

Furthermore, the tube may be constructed as a diffuser, i.e., with a tapered cross-section. The tube then becomes an acoustic throat.

Another advantageous further embodiment of the invention envisions that the volume change may be effected pneumatically and/or hydraulically and/or electrically and/or mechanically. On board streams of vehicle fluids, push/pull cables and/or electric motors may be used as auxiliary power sources for the volume change of the expansion body, particularly on the upstream side (i.e. the unfiltered air side) of the intake manifold.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIG. 9 is a longitudinal sectional view of an embodiment in which the element for changing the effective inside diameter of the tube is a cone-shaped control element;

FIG. 9a is a sectional view taken along line E—E of FIG. 9; and

FIG. 9b is a sectional view taken along line F—F of FIG. 9.

DETAILED DESCRIPTION OF PREFERRED EMBODIMENTS

Figure 1:
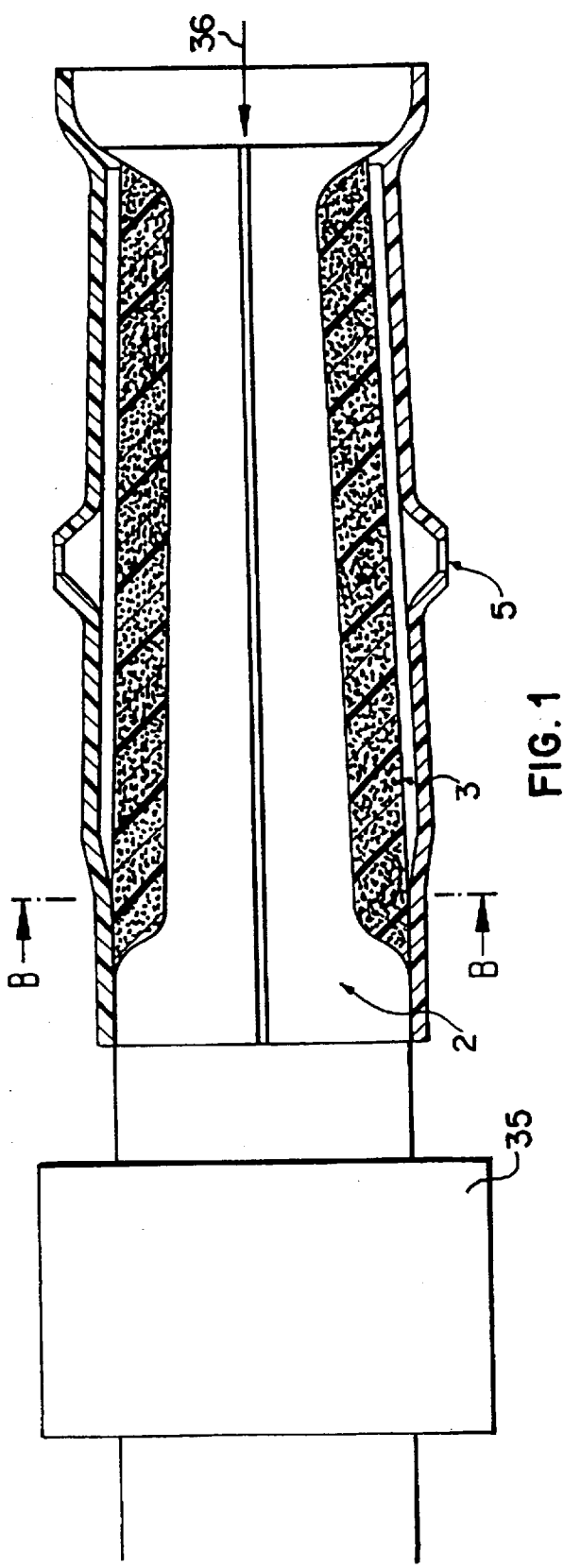
FIG. 1 is a longitudinal sectional view of a damper tube according to the invention.
Figure 4:
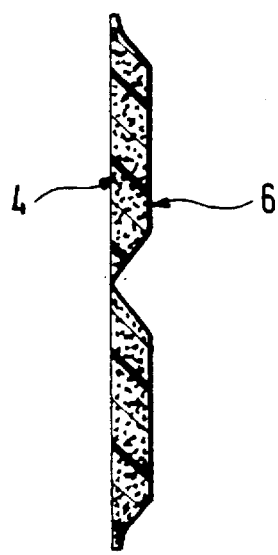
FIG. 4 is a transverse sectional view taken along line A—A of FIG. 3.

FIG. 1 depicts a tube having an inside tube surface 1 on which a diameter changing element 3 is mounted which changes the inside tube diameter 2. In FIG. 1, the diameter changing element 3 is an expansion body which reduces the inside tube diameter. As can be more clearly seen in FIG. 4, the expansion body comprises an open-pore, air-permeable supporting insert 4 made of PUR foam and an air-impermeable layer 6. In order to expand the inside diameter of the tube, the gas contained in the expansion body is partially or completely evacuated through the vacuum connection 5. The application of the vacuum to the expansion body is effected in a manner analogous to the application of vacuum to the vacuum advance mechanism of a vacuum advanced ignition system of an internal combustion engine. The diameter changing element 3 is arranged in the intake tube on the unfiltered air side (i.e., upstream side) of the air filter 35, as indicated by the arrow 36 showing the airflow direction through the tube.

Figure 2:
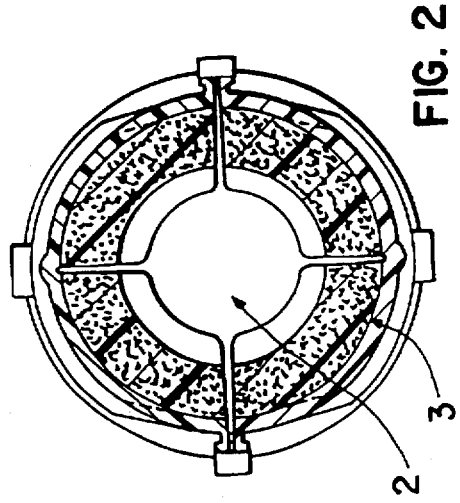
FIG. 2 is a sectional view taken along line B—B of FIG. 1.

FIG. 2 illustrates an embodiment with four expansion bodies 3. The geometric configuration of the expansion bodies 3 assures that when a vacuum is applied, the inside diameter of the tube will increase substantially concentrically and the conical shape of the diffuser will be maintained.

Figure 3:
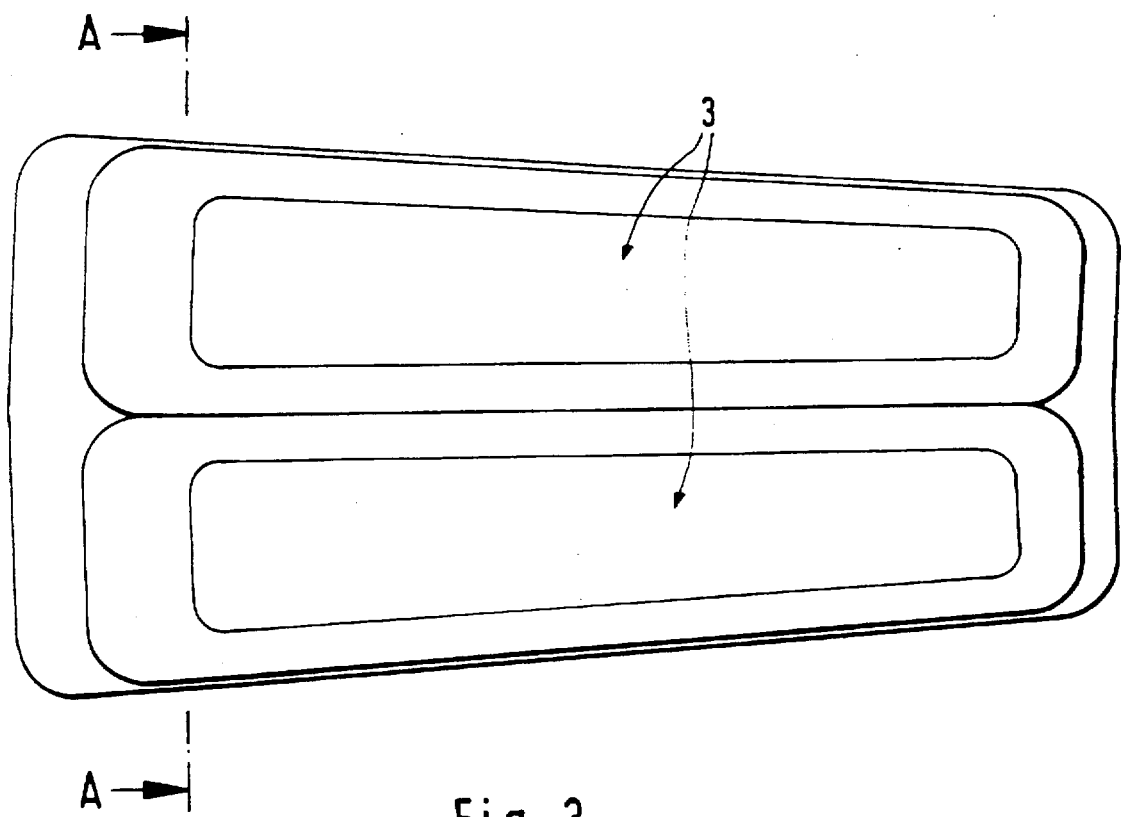
FIG. 3 is a view from inside the tube.

FIG. 3 is a view of the inner diameter changing elements 3 from inside the tube.

Another embodiment provides that the elements 3 consist, for example, of shell segments which are movable with respect to one another and which are driven by push/pull cables or electric motors as a function of the operating condition of the internal-combustion engine. One particular embodiment envisions that the shell segments are moved in a manner comparable to the movement of an iris diaphragm. In another embodiment, the two half shells are connected at one end in such a manner that although they form a substantially constant tube diameter at that one end, the other ends of the half shells can move either toward or away from each other and thus change the diameter of the tube.

Figure 5:
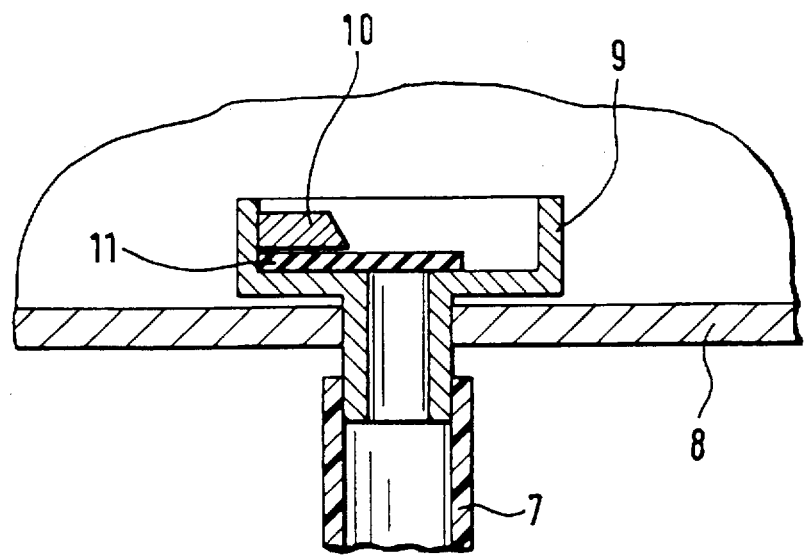
FIG. 5 is a sectional schematic view of a pressure control.

FIG. 5 relates to an embodiment in which one end of a connecting hose 7 is attached to the vacuum connection 5 shown in FIG. 1. FIG. 5 shows how the other end of the hose 7 is attached to the outside end of a valve support body 9 which is extended from the inside to the outside through the wall 8 of the intake manifold. The valve support body 9 contains a check valve which preferably comprises a small silicone rubber leaf 11 and a rubber clamp holder 10. Of course, it is also possible to construct the check valve from a metal sheet or metal foil. The use of a check valve or return valve is particularly helpful because the required control pressures for changing the inside diameter of the tube lie between 0 and −100 mbar; the volume reduction of the foam material starting at approximately −20 mbar, and reaching its highest point at approximately −100 mbar. However, as a result of the pulsation in the intake manifold, particularly under full load, an average value occurs which is only about −65 mbar. Nevertheless, because of the check or return value, the maximal value of −100 mbar is applied to the expansion body. Preferably, the valve support body 9 is mounted in front of the throttle valve in the flow direction (i.e., upstream of the throttle valve). However, it is also possible to mount the valve support body behind (i.e., downstream of) the throttle valve.

Figure 6:
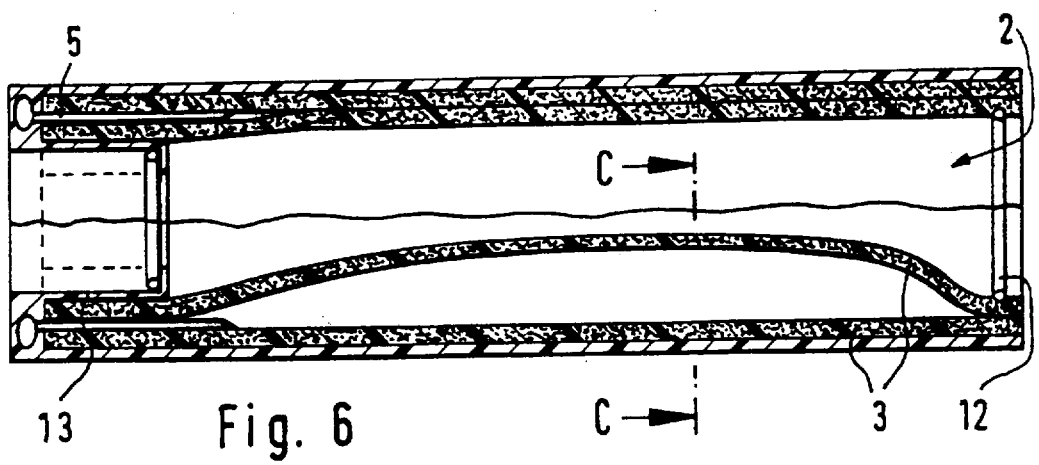
FIG. 6 is a longitudinal sectional view of a damper tube with inserted tubular hose sections.

FIG. 6 depicts an embodiment in which the elements 3 for changing the inside diameter 2 of the tube comprise sections of tubular hose. The tubular hose sections are preferably made of a synthetic plastic material. In an alternative embodiment, they are composed of extruded foam material. As shown in FIG. 6, the diameter changing elements 3 are fastened inside the intake manifold by means of annular inserts 12 or by means of one annular insert 13 provided with an integrated vacuum connection 5 for each element 3 for changing the inside tube diameter 2. The annular inserts 12 and 13 fix the tubular hose sections in position and also seal off the tubular hose sections in a pressure-tight manner with respect to the wall of the intake manifold housing.

Figure 6A:
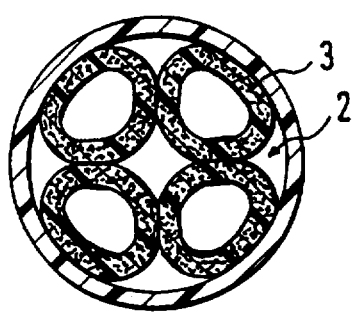
FIG. 6a is a sectional view taken along line C—C of FIG. 6.
Figure 7:
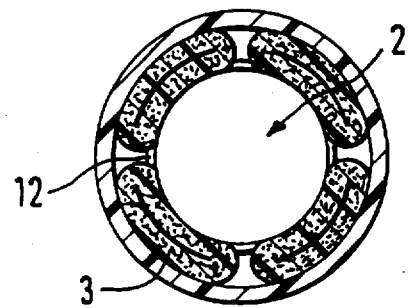
FIG. 7 is a sectional view showing the fixing of the hose sections by means of the insert 12.

As illustrated in FIGS. 6a and 7, four of such cushion-type bodies 3 can fit into one tube 2. FIG. 6a shows the tube of the invention with the inner diameter decreased; that is to say with the no applied vacuum so that the elements 3 are expanded. FIG. 7 depicts the tube of the invention with the inner diameter increased; or in other words with the vacuum applied to elements 3 so that the elements 3 are collapsed.

Figure 8:
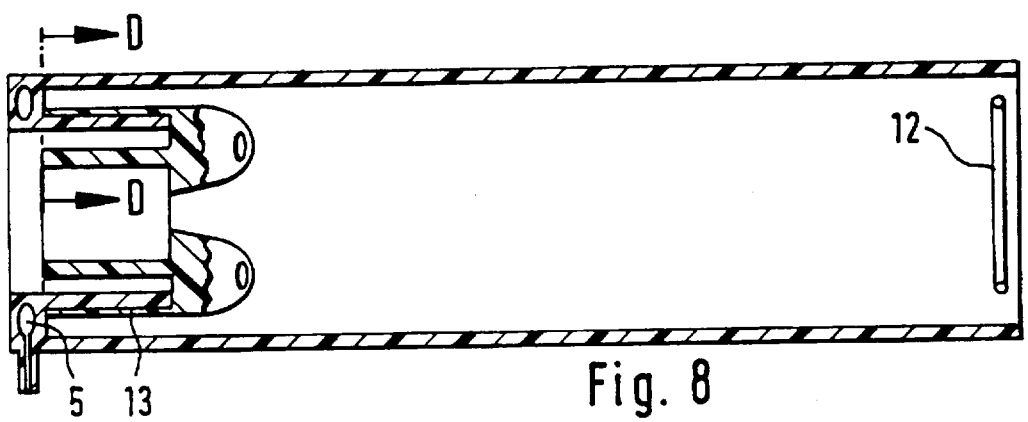
FIG. 8 is a longitudinal sectional view of a damper tube without hose sections.
Figure 8A:
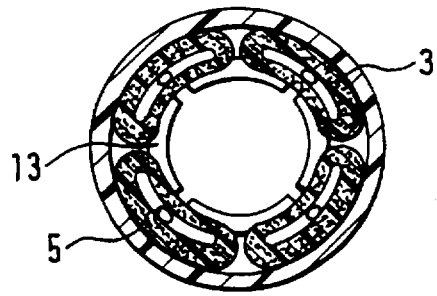
FIG. 8a is a sectional view taken along line D—D of FIG. 8.

In an alternative embodiment, the elements 3 for changing the inside tube diameter 2 are fixed by means of tongue-shaped inserts 13 in such a manner that the interior geometry of the intake section acts as a diffuser, as illustrated in FIG. 8.

By means of the form-locking clamping between the tubular hose sections and the annular inserts 12 and 13, for example, four air-filled elements 3 are created whose volume can be changed by means of the vacuum connection 5 as a function of the operating condition of the internal-combustion engine. The vacuum connection 5 may, for example, communicate with the inlet duct of a turbocharger. However, it is possible to use just about any other source of subatmospheric pressure in an internal combustion engine to control the inner diameter of the intake manifold tube.

In a further embodiment, which is illustrated in FIGS. 9, 9a and 9b, an element 23, which can be moved either in the same direction or opposite the direction of flow of air drawn into the manifold, is arranged in the interior of the intake tube, in particular on the unfiltered air side (i.e., upstream side) of the air filter.

An interior cone 23, which is secured by means of the supports 26, 27, 28 and the supporting rod 24, is inserted into the intake duct 21 constructed as a diffuser.

When a signal, which is a function of the condition of the internal-combustion engine, is supplied to the adjusting device 25 via signal lines 31, the adjusting device 25, which is shown as an electric motor, can cause a longitudinal displacement of the interior cone 23 by rotating the threaded displacement element 30 in the threaded receptacle 29.

If the interior cone 23 is moved against the flow direction, the annular gap remaining between the tube wall and the interior cone will be progressively decreased, and the intake noise will be reduced. As illustrated in FIG. 9a, the interior cone 23 is hollow and is mounted on a profiled supporting rod 24.

The adjusting device 25 may be controlled, for example, by the existing engine control Unit in the motor vehicle as a function of the characteristic data available in the control unit, such as partial load/full load or rotational speed/load, etc. The production of the adjusting device is illustrated in FIG. 9b by means of the support 26. In the illustrated embodiment, the longitudinal displacement of the interior cone 23 takes place by way of the displacement element 30 which is constructed as a worm shaft which has a corresponding bearing in the receptacle 29. The supporting rod 24 is disposed in an axially displaceable manner in the support 28 in the interior of the interior cone. The supporting rod 24 is also disposed in an axially tolerant manner in the support 27 of the interior cone 23. A stop may be provided at the end of support rod 24 to prevent cone 23 from sliding off the end of the rod.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air intake tube for an intake manifold of an internal-combustion engine, said tube having an inner surface provided with at least one adjusting element for controllably changing the inside diameter of the tube, said adjusting element being located upstream of an air filter arranged in said intake manifold.

2. A tube according to claim 1, wherein said at least one adjusting element comprises an expansion body which can be controllably changed in volume.

3. A tube according to claim 2, wherein said expansion body comprises a foam supporting insert.

4. A tube according to claim 2, wherein said expansion body is in fluid communication with a portion of said intake manifold located downstream of said expansion body.

5. A tube according to claim 1, wherein said adjusting element is operatively connected to an electronic control system for an internal combustion engine.

6. A tube according to claim 2, wherein said expansion body is connected to a vacuum system.

7. A tube according to claim 2, wherein said expansion body is collapsed by application of a vacuum.

8. A tube according to claim 2, wherein a stream of air flows through said tube, and said expansion body changes in volume as a function of the volume of said stream of air.

9. A tube according to claim 1, wherein said tube is constructed as a diffuser.

10. A tube according to claim 1, wherein the inside diameter Of the tube is changed pneumatically.

11. A tube according to claim 1, wherein the inside diameter of the tube is changed hydraulically.

12. A tube according to claim 1, wherein said adjusting element comprises an open-celled foam body with an air-impermeable surface layer.

* * * * *